United States Patent
Darby et al.

(10) Patent No.: US 7,330,540 B2
(45) Date of Patent: Feb. 12, 2008

(54) SYSTEMS AND METHODS FOR PROVIDING CONFERENCE COMMUNICATION

(75) Inventors: Matthew T. Darby, Denver, CO (US); Isaac J. Hepworth, Denver, CO (US)

(73) Assignee: Qwest Communications International Inc., Denver, CO (US)

( * ) Notice: Subject to any disclaimer, the term of this patent is extended or adjusted under 35 U.S.C. 154(b) by 974 days.

(21) Appl. No.: 10/444,112

(22) Filed: May 21, 2003

(65) Prior Publication Data

US 2004/0234058 A1    Nov. 25, 2004

(51) Int. Cl.
*H04M 3/42* (2006.01)
*H04M 1/00* (2006.01)

(52) U.S. Cl. .................. 379/202.01; 379/158

(58) Field of Classification Search ........... 379/202.01, 379/203.01, 204.01, 205.01, 206.01, 207.01, 379/93.21, 158
See application file for complete search history.

(56) References Cited

U.S. PATENT DOCUMENTS

| | | | |
|---|---|---|---|
| 5,559,876 A * | 9/1996 | Alperovich | 379/205.01 |
| 6,606,305 B1 * | 8/2003 | Boyle et al. | 370/260 |
| 6,996,221 B1 * | 2/2006 | Baiyor et al. | 379/202.01 |
| 2003/0223562 A1 * | 12/2003 | Cui et al. | 379/202.01 |

OTHER PUBLICATIONS

*Octave Improv*, Octave Communications Inc., http://www.octavecomm.com, 51 pages, 2000.
*It's here*, Wireless Week, http://www.wirelessweek.com, 2 pages, 2001.

\* cited by examiner

*Primary Examiner*—William J. Deane, Jr.
(74) *Attorney, Agent, or Firm*—Townsend and Townsend and Crew, LLP

(57) ABSTRACT

Systems and method for providing conference communications. Various of the methods include receiving a communication request that includes an access identification. The access identification is used to identify two or more connections. Communication is initiated between communication devices associated with the two or more connections and the communication device that initiated the communication request. Various systems are also disclosed that implement the aforementioned method, as well as other methods.

14 Claims, 3 Drawing Sheets

SYSTEMS AND METHODS FOR PROVIDING CONFERENCE COMMUNICATION

BACKGROUND OF THE INVENTION

The present invention is related to telecommunication systems and method for using such. In particular, the present invention is related to systems and methods for providing multi-contact communications.

In a typical application, a telephone number is entered into a telephone handset and a ring signal is created on another telephone handset associated with entered telephone number. A user can then answer the ringing telephone and initiate a two party communication. Performing communication between three or more users is, however, more complicated.

In a typical conferencing situation, one party contacts a telecommunication service provider to setup a conference call. The telecommunication service provider provides a telephone number and a conference ID number to the initiating party. Then, the initiating party contacts each of the other prospective conference participants and provides them with the telephone number, the conference ID, and the time that the conference will take place. At the prescribed time, each of the conference participants calls the number, and subsequently provides the conference ID. Once this is done, the participants are placed in joint communication. While such an approach is useful, it is both cumbersome and expensive.

In some cases, more sophisticated telephone handsets provide for conferencing in multiple parties. Such conferencing can include an initiating user dialing one prospective conference participant and establishing a two way communication with that participant. Subsequently, the initiating user dials another prospective conference participant on a separate line to establish two way communication with that participant. Then, a conference option is selected which causes the three parties to be included on the same call. In addition to the complexity of the aforementioned approach, such conference calls typically may only connect a limited number of parties such as three.

Further, such an approach is often complicated where a cellular telephone is used to initiate the conference. In part this is because creating the conference often requires reading menus and pushing buttons while at least a portion of the participants are already joined. This can require the initiator to remove the cellular telephone from their ear to see the keyboard and display. While in this situation, confusion can arise and previously joined participants my hang up. This potential confusion is illustrated by the complexity of processes that must be performed in an exemplary cellular telephone that requires an initiator to: (1) make a normal call to the first participant; (2) press an OPTIONS key, (3) scroll to NEW CALL and press SELECT, (4) Recall or enter the number of the next participant that is to be included, (6) press call, (7) after the next participant answers, press the OPTIONS key, and (8) scroll to CONFERENCE and press Select. Such complexity causes many users to simply disregard the conference functionality of a given telephone.

Thus, there exists a need in the art to address these and other problems.

BRIEF SUMMARY OF THE INVENTION

In some embodiments, the present invention provides systems and methods whereby a multi-party communication can be initiated by providing a single access identification. As just one example, a user may be provided with a telephone number that has been assigned to a semi-static group. When the user dials the telephone number, a telephone call to each member of the semi-static group is initiated causing the telephones of the various members to ring. As the members answer the ringing telephones, they are included as part of the ongoing teleconference with the other answering members.

Particular embodiments provide systems capable of shared voice communication links between three or more users. The systems include a computer communicably coupled to a packet based network, and accessible via a public switch telephone network. The systems also include a computer readable medium that is accessible to the computer, and contains software executable by the computer to receive an access request including a single access identification. A number of connections associated with the single access identification are identified, and ring indicators on telephones respectively associated with the identified connections are initiated. Audio signals are received via the initiating and connected telephones, and the audio signals are mixed. The mixed audio signal is then distributed to each of the initiating and connected telephones. In this way, a multi-party conference call can be performed. From a user's perspective, initiating the multi-party conference can proceed similar to that of a standard telephone call. This reduces the amount of complexity associated with conferencing.

In some aspects of the embodiments, the single access identification is a telephone number, while in other aspects, the single access identification is derived from an outgoing telephone number and an incoming identification. Such an incoming identification can be, for example, a telephone number or a unique identification associated with a telephone initiating the access request. In this way, a single dial in number can be used to initiate multi-party calls associated with different semi-static groups, while allowing the conference to be initiated similar to a standard telephone call.

Other embodiments of the present invention provide one to many telephone systems including a public switched telephone network operable to: receive a telephone number from a first telephone; access a semi-static group based at least in part on the telephone number; contact a second and a third telephones; mix audio input information from the first, second, and third telephones to create a mixed audio output; and provide the mixed audio output to the first, second, and third telephones.

Yet other embodiments of the present invention include methods for providing shared voice communication links between three or more users. The methods include receiving an access request via a telephone at a telephone number, and identifying a plurality of connections associated with the telephone number. Ring indicators are initiated to the telephones associated with the identified connections. In addition, audio signals from the telephone initiating the access request and the other telephones are mixed, and the mixed signal is provided to the telephones. Using such a method, a conference call, for example, can be provided that is initiated via a single access request.

In some aspects of the embodiments, the methods further provide for forming semi-static groups. This can include receiving an identification of connections and/or telephone numbers associated with the connections. The received connections can then be formed into a semi-static group, or added to a semi-static group, and the semi-static group can be associated with a conference telephone number. Such semi-static groups can include, for example, family members, workgroup members, friends, and/or the like.

Various aspects further include providing a graphical user interface for implementing the semi-static group. This graphical user interface can be accessible via a telephone handset coupled to a public switched telephone network, a computer coupled to a communication network such as the Internet, and/or the like.

Some aspects of the embodiments further include receiving an identifier associated with an initiating telephone. The identifier can be, for example, the telephone number associated with the telephone, or some other unique identifier associated with the telephone. In such cases, the semi-static group can be identified through a combination of the identifier and the dialed conference telephone number. Where such an approach is applied, the methods can further include receiving another access request at the same conference telephone number, and using the identifier associated with the initiating telephone to access a different semi-static group than that previously accessed. A conference can be initiated for this other semi-static group in a fashion similar to that previously described.

Various aspects of the present invention provide for conferencing between telephones that have fixed fee connections, while other aspects provide for conferencing between any telephones or other communication devices regardless of any fee agreement. Thus, for example, in some cases, conferences can be initiated between communication devices connected via local telephone service, voice over IP service, long distance telephone service, and/or the like.

Yet additional embodiments of the present invention provide methods for providing one to many communication access. Such methods include receiving an access request including an access identification via a communication device. A plurality of connections are identified that are associated with the access identification. A conference request is initiated to communication devices associated with the identified connections, and communication signals are received from the initiating communication device and the identified communication devices. These communications are shared with other communication devices forming part of the conference.

In some cases, the communication devices are selected from a cellular telephone, a wired telephone, a voice over IP receiver/transmitter, a computer for receiving and/or transmitting text messages, a computer for receiving and/or transmitting video messages, and/or the like Further, in some cases, the communication signals are audio signals, while in other cases, the communication signals are video signals, text signals, audio signals, and/or a combination thereof.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
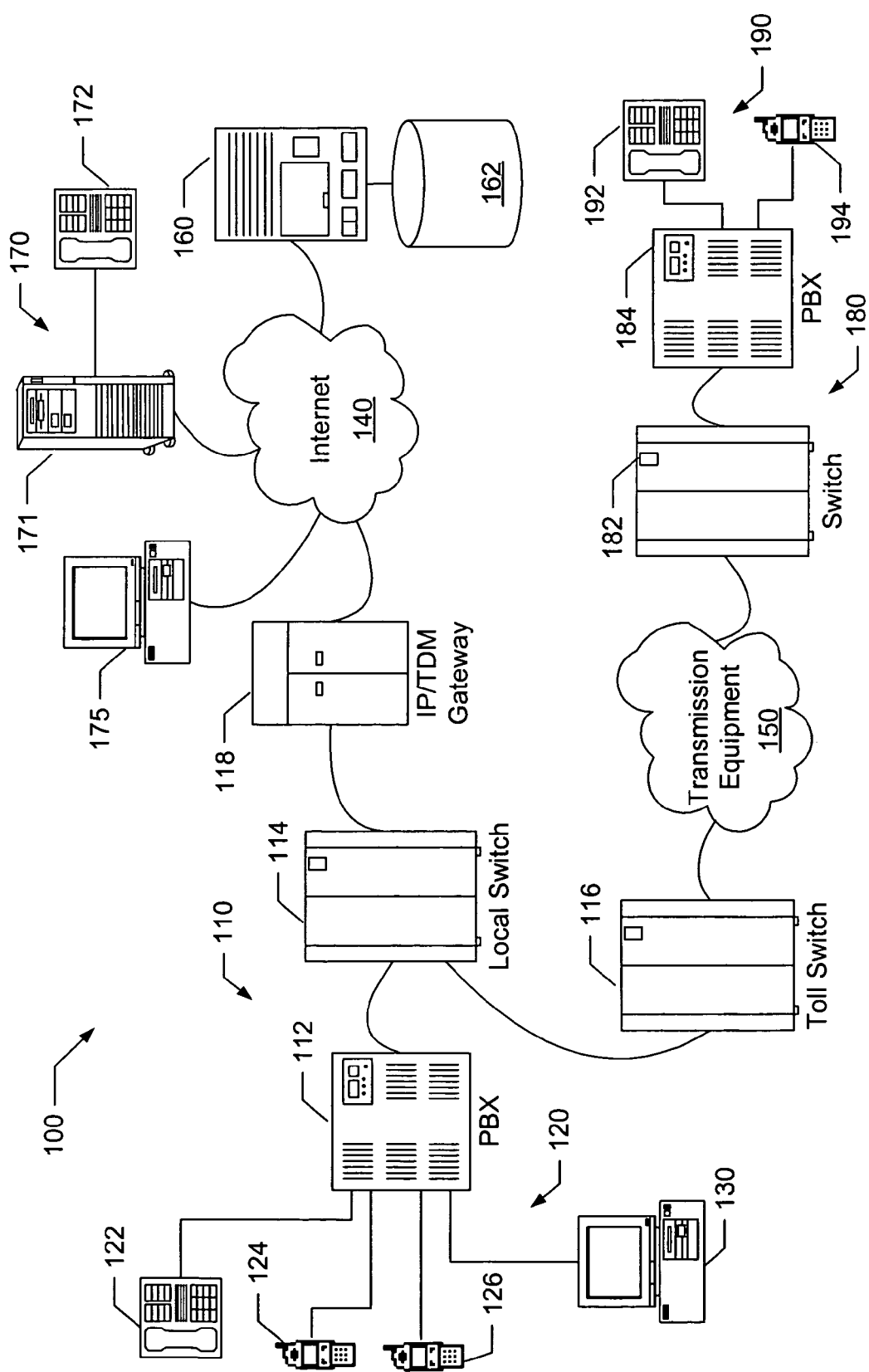
FIG. 1 depicts an exemplary system that can be used in accordance with embodiments of the present invention.

The present invention is related to telecommunication systems and methods associated therewith. In particular, the present invention is related to systems and methods for providing multi-contact shared communications.

Among other things, the present invention provides an inexpensive, simple conferencing system. In some embodiments, the conferencing system is based around static or semi-static groups of three or more conference participants. As used herein, a static or semi-static group is a group of prospective conference participants that can be modified by updating a group profile. As some examples, a group profile may identify a group of family members, a work group, a study group, a group of friends, and/or the like.

In some embodiments, the conferencing system is capable of placing multiple parties in communication through processes that look to an end user much like a common two party telephone call. The following example illustrates the functionality associated with such embodiments of the present invention.

In the example, a user, Alice, signs up for a conference service. As part of signing up for the service, Alice identifies one or more members to be included in a semi-static group, along with providing her own name and/or a group name. Such identification of members can include providing a telephone number, or other access identification for the identified users. In addition, Alice is assigned a telephone number that is associated with the semi-static group. From that point forward, when Alice calls the assigned telephone number, a conference call is initiated between all members in the semi-static group. Thus, each member's telephone rings, and everyone that answers hears "Alice wants you to join a conference with the group—press star to join—or pound to send your apologies". Everyone who responds by pressing the star key is added to the conference.

In some cases, once the conference is set up, there are no star codes or other in-call features, and everyone can hang up whenever they want without disrupting the conference, including the initiator, Alice. Further, in some cases, the access telephone number is permanently assigned to the semi-static group allowing for future conferences by simply using the same conference telephone number. Alternatively, the access telephone number may be a one time use number. In such cases, a request can be made to assign another number to the semi-static group to perform an additional conference. Thus, as will be appreciated by one of ordinary skill in the art, systems and methods for conferencing in accordance with embodiments of the present invention can provide a simple straight forward means for joining a number of individuals on a teleconference, or other shared communication link.

In various cases, only numbers from the local calling area, or another fixed fee area are included in a semi-static group.

This can reduce any complexity introduced by various telecommunication services' billing schemes. Alternatively, some cases may include members outside of the local calling area. In such cases, all communications may be billed as if they were part of a fixed fee billing, or each of the connections may be billed individually. Based on the disclosure provided herein, one of ordinary skill in the art will appreciate a number of billing schemes and/or mechanisms that can be employed in relation to the present invention.

Turning to FIG. 1, a system 100 in accordance with some embodiments of the present invention is illustrated. System 100 includes a public switched telephone network ("PSTN") 110, one or more private branch exchanges ("PBX") 112, one or more local switches 114, and one or more toll switches 116. Various communication devices 120 can be coupled to PSTN 110 including, but not limited to, cellular telephones 124, 126, wired telephones 122, and computers 130. As used herein, a telephone is any communication device capable of receiving and transmitting audio signals. Thus, for example, a telephone can be a cellular telephone, a wired telephone, a voice enabled personal digital assistant ("PDA"), a personal computer (PC) with a microphone and speakers, or the like. Also as used herein, a computer can be any microprocessor and/or digital signal processor based device. Thus, a computer can be a PC, a server, a workstation, a cellular telephone, a PDA, or the like. PBX 112 can be any switching system providing voice and data switching in a particular portion of PSTN 110. Local switch 114 can be any switch or switching system as known in the art. Further, local switch 114 can represent the extent of PSTN 110 that local, or fixed fee voice service is offered.

Toll switch 116 can be any switch or switching system that connects a local area of PSTN 110 to a per call, or per time fee area of PSTN 110. As such, toll switch 116 is communicably coupled to transmission equipment 150 that in turn is communicably coupled to another local region 180 of PSTN 110. Local region 180 of PSTN 110 includes one or more switches 182 and PBXs 184 connecting a number of communication devices 190 to PSTN 110. As depicted, communication devices 190 can include, but are not limited to, a wired telephone 192 and a cellular telephone 194. Transmission equipment 150 can be any equipment for linking local region 180 to PSTN 110. Thus, for example, transmission equipment 150 can include wire, fiber optic cable, satellite transmission equipment, radio frequency transmission equipment, microwave transmission equipment, and/or the like.

System 100 can also include one or more gateways 118 for coupling PSTN 110 to the Internet 140. Gateway 118 can be any unit or system known in the art that is capable of communicably coupling a data network such as the Internet 140 to PSTN 110. In addition, system 100 includes one or more application servers 160 coupled to one or more databases 162. Application server 160 can be any microprocessor based device capable of receiving and servicing access requests. In one particular embodiment, application server 160 is an AS400™ manufactured by IBM™, while in other embodiments, application server 160 is a PC. Yet further, system 100 can include a number of computers 175 communicably coupled to the Internet 140, and/or voice over IP systems 170 also communicably coupled to the Internet 140. As used herein, a voice over IP system 170 can be any system or device capable of facilitating voice communications over the Internet 140. Such voice over IP systems can include, but are not limited to, a computer processor 171 coupled to the internet 140 and a speaker/microphone pair 172 for receiving and providing audio information.

Figure 2:
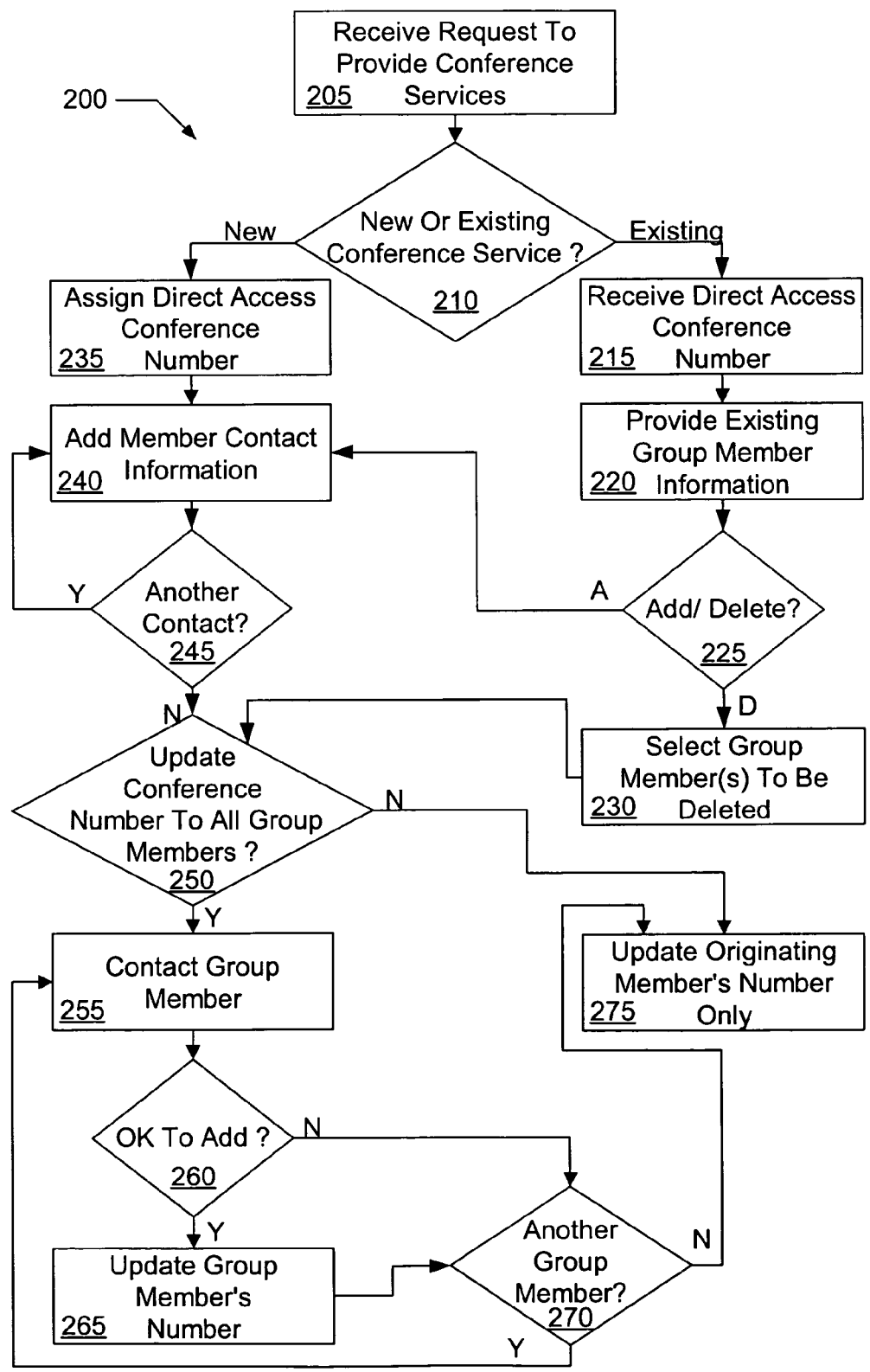
FIG. 2 is a flow diagram depicting methods in accordance with some embodiments of the present invention for defining a semi-static group.

Turning now to FIG. 2, a flow diagram 200 illustrates a method in accordance with various embodiments of the present invention for defining static or semi-static groups. Following flow diagram 200, a request is received to provide conference services (block 205). This can include a user accessing an Internet website maintained by a telecommunications service provider, and entering a request to receive conference services. Such a request may be accompanied by an electronic payment for the services, and/or an agreement to pay for the services. Alternatively or in addition, the request may be automatically entered when the user purchases a cellular telephone and provides group member identification to the retailer. As yet another alternative, a user may contact a telecommunications service provider via a telephone handset and make a request. Based on the disclosure provided herein, one of ordinary skill in the art will appreciate a number of ways that a user may make a request for conference services, as well as systems and devices useful in making that request.

It is determined whether the request for conference services is a new request or is a request to modify existing conference services (block 210). Thus, for example, a user may be requesting to set up a new semi-static group, in which case the request is for a new conference service. Alternatively, a user may request to modify an existing semi-static group, in which case the request is for existing conference services.

Where the request is for new conference services (block 210), a direct access conference number is assigned to the semi-static group that is to be formed (block 235). In some embodiments, this direct access conference number is a telephone number, similar to a telephone number that would be used to make a two-party call. In some embodiments, this conference telephone number is augmented by an identifier associated with a telephone handset of the user. This identifier can be, for example, the telephone number associated with the telephone handset, or a serial number of a processor functioning on the telephone handset. By using this identifier, the conference telephone number associated with the semi-static group can be assigned to multiple semi-static groups, but differentiated by this additional identifier when a call on the conference telephone number is received.

In some cases, identifier's from telephone handsets associated with each member of the semi-static group can also be added. Thus, a call at the telephone number initiated from any of handsets associated with the members of the semi-static group can be used to select the proper semi-static group using a broadly assigned conference telephone number. These additional identifiers can be updated to the record associated with the semi-static group when a member of the semi-static group is contacted and their telephone is queried, or simply from the telephone numbers entered into the semi-static group record.

Identification information for a member within the semi-static group is entered by the user (block 240). Thus, for example, where the semi-static group is the user's family, the identification information may consist of the member's name, MOM, and MOM's telephone number, 222-222-2222. It is next determined if all members of the semi-static group have been added (block 245). Where other members are to be added such as, for example, DAD, the process of adding another member is repeated. In this case, the member's name, DAD, and DAD's telephone number, 333-333-3333 are added. All of this information can be maintained in a semi-static group record that may also include a group name such as, for example, FAMILY. In addition, the user can enter their information such as, for example, SON at telephone number 444-444-4444.

As will be appreciated, all of the members within the semi-static group may be limited to members within a fixed fee calling area. These can include members available within a local telephone calling area, or via voice over IP protocol. Alternatively, the members may be from both fixed fee calling areas and per call or per minute calling areas. In such cases, the semi-static group record may indicate the method for distributing charges associated with a conference. For example, each of the conferenced members may pay any tolls associated its portion of the conference, or a certain number of minutes of per minute calling may be included in the conferencing system such that conference time below a set level may be ignored, or the initiating member may be responsible for any per call or per time charges associated with the conference. Based on this disclosure, one of ordinary skill in the art will appreciate the myriad of billing schemes that can be implemented in relation to the present invention.

In one particular use, only a single person in addition to the initiating user is placed in the semi-static group. This person may have many telephone numbers including, for example, a cell telephone number, a work number, a home number, a vacation house number, and/or the like. Each of the contacts can be placed in the semi-static record such that when the person is to be contacted, all of the person's numbers are contacted simultaneously. This avoids the need for the initiating user to dial each of the person's numbers. In such a case, the semi-static group may include a direction to terminate all other calls after a successful response is received on any of the numbers. Alternatively, the semi-static group may contain a direction to call each of the numbers in sequence, allowing a certain number of rings at each number before moving onto the next number.

Once all of the members of the group have been added (block 245), it is determined whether the conference number is to be updated for use by all members of the group, or whether the conference number is only for use by the user that requested the conference number (block 250). Where the number is only to be accessed by the requesting member (block 250), only a call from the requesting member at the number will cause a conference to be initiated (block 275). This can be determined by, for example, checking the telephone number or other identifier associated with the telephone handset initiating the conference. Where a call is received from other members in the group, it will give a busy signal, some other out of service signal, or may offer the service to the unauthorized member for a fee.

Alternatively, where other member's of the group may also desire to initiate conference calls using the number (block 250), each of the members can be contacted (block 255). Each of the members can be queried about whether they desire the service and/or whether they are willing to pay a fee associated with the service (block 260). Where the contacted member agrees, access via the contacted member's handset is enabled (block 265). This process continues until all members have been given an opportunity to accept or decline (block 270). In addition, access from the initiating member's handset is enabled (block 275).

In some cases, the process of contacting each of the group members is not utilized (blocks 250-275), rather all members of the semi-static group are allowed to conference using the assigned number. This can be the case where either the semi-static group is assigned a unique telephone number, or where the assigned telephone number is augmented with an identifier from the various handsets associated with members of the semi-static group.

Alternatively, where an existing semi-static group is to be modified (block 210), a previously assigned direct access conference number is provided (block 215). This direct access conference number (in some cases augmented by an identifier from a telephone handset of one of the members) is used to select the record associated with the semi-static group to be modified. This semi-static group information is then provided to the accessing user (block 220). It is determined whether a member in the semi-static group is to be added or deleted (block 225). Further, it may be determined whether rules associated with the semi-static group are to be modified. Such rules can include, but are not limited to, who pays for conferences, which of the members can initiate a conference, and the like.

Where another member is to be added to the semi-static group (block 225), the member addition process discussed above in relation to blocks 240 and 245 is performed. In some cases, the newly added member is also contacted as discussed above in relation to blocks 250 through 265. Alternatively, where a member is to be deleted from the semi-static group (block 225), the member to be deleted is selected (block 230). In some cases, the deleted member is contacted to determine if the deletion is acceptable (blocks 250-265). This process can continue until all modifications to the semi-static group have been completed.

Based on the disclosure provided herein, one of ordinary skill in the art will appreciate that the aforementioned methods can be facilitated by a series of Internet web pages that guide a user, and accept a user's selections. Alternatively or in addition, a menu driven system can also be used via a telephone handset to perform the aforementioned setup functions. Based on the disclosure provided herein, one of ordinary skill in the art will appreciate a myriad of systems and methods for identifying and/or modifying semi-static groups.

Figure 3:
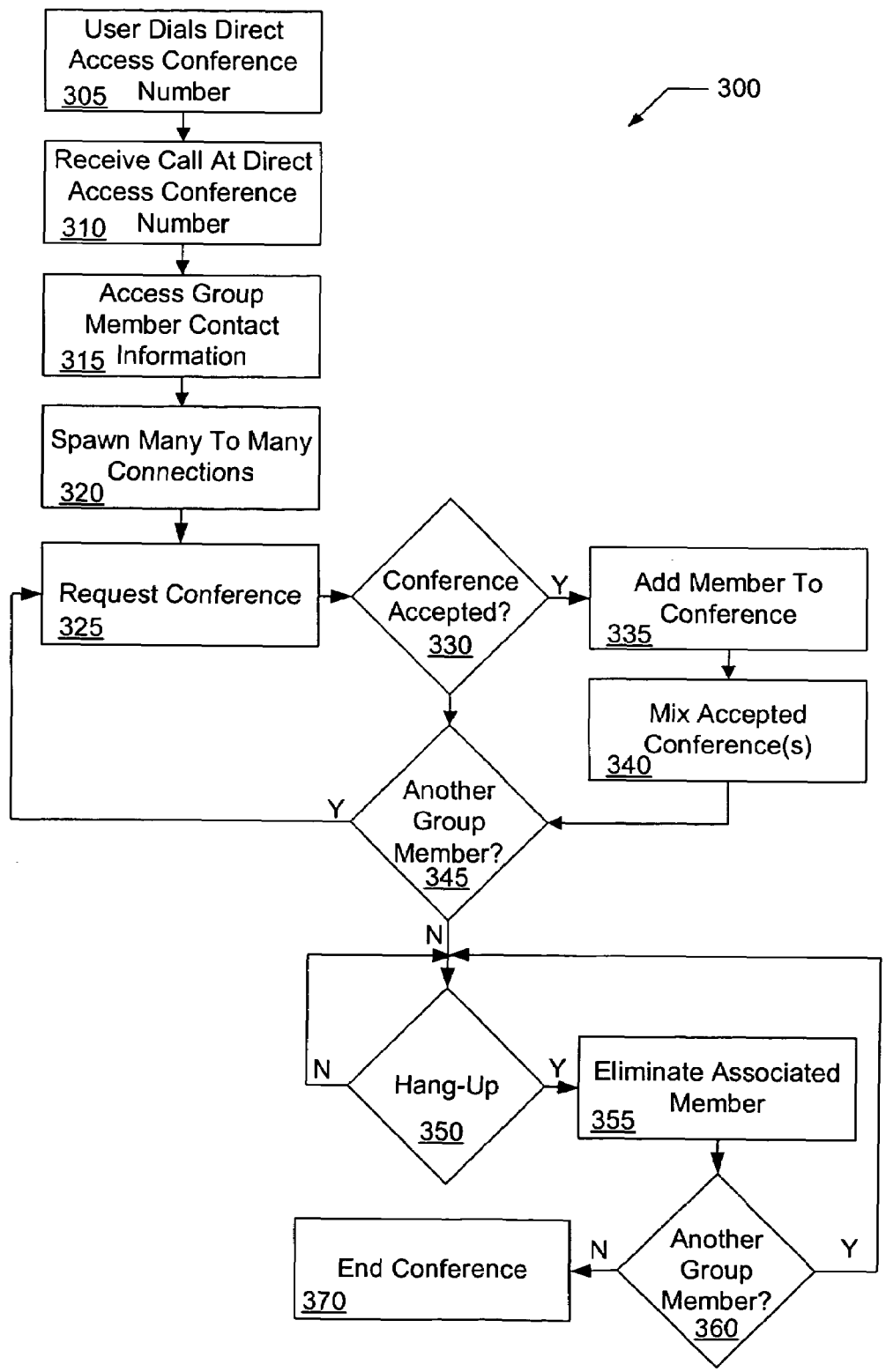
FIG. 3 is a flow diagram illustrating methods in accordance with various embodiments of the present invention for performing a conference.

With the semi-static group thus defined, conference calls can be initiated using the assigned telephone number (in some cases in conjunction with the aforementioned identifier). Turning to FIG. 3, a flow diagram 300 illustrates a method in accordance with some embodiments of the present invention for performing a multi-party conference. Following flow diagram 300, a user dials the direct access conference number (block 305). As previously described, this can be a telephone number associated with a semi-static group.

The call is received and routed to an access point (block 310). The access point can be an application server communicably coupled to the Internet, or a switch implemented as part of a PSTN. A semi-static group record associated with the direct access conference number is accessed (block 315), and a voice call is initiated to each of the members identified in the semi-static group (block 320). As the voice calls are answered by the respective members, a request to join a conference is played to each of the members (block 325). The request could be, for example, "Hello, a conference has been initiated by INITIATING USER's NAME for the SEMI-STATIC GROUP NAME, would you like to join?—Press the star key to join, or the pound key to decline."

The pressed key, star or pound, is monitored to determined if the contacted member wishes to accept or decline (block 330). Where the member accepts, the accepting member is added to the conference (block 335), and the voice input from the accepting member is mixed with the voice input from other accepting members (block 340). The mixed voice inputs are provided to each of the members on the conference. This process continues until all members within the group have either accepted, declined, or are determined to be not available for failure to answer the telephone or due to a busy signal on the telephone.

When one of the members hangs up their telephone (block 350), that member is eliminated from the conference (block 355). This can include removing the audio input from that member from the mixed audio input, and terminating the audio output to that member. The conference is monitored to determine if two or more members remain on the conference (block 360). Once the conference consists of less than two members, the conference is ended.

A number of services can also be offered in relation to embodiments of the present invention. For example, a personal identification number ("PIN") number may be provided to users such that they can initiate a conference from a previously unknown telephone handset using the assigned conference telephone number. This PIN number may not be needed where the conference is initiated via the conference telephone number without requiring an additional telephone handset identifier. One time PIN numbers could also be issued. Such one time PIN numbers could be provided to a person that is not a member of the semi-static group, and used to allow that person to temporarily join the semi-static group without requiring any modification to the semi-static group. Further, an update service could be put in place to identify users that interact consistently across email or other media, and the users could be invited to set up a conference system similar to that previously described, whether it be voice, text, or video, or some combination thereof.

The invention has now been described in detail for purposes of clarity and understanding. However, it will be appreciated that certain changes and modifications may be practiced within the scope of the appended claims. For example, while the invention has been described in relation to a voice conference, one of ordinary skill in the art will understand that the present invention can be applied to a text messaging conference where text messages from multiple conferenced members can be interleaved to form a text conference. In such a system, the text message contact information can be maintained in a semi-static group record. Further, conferences of mixed media, such as audio, video, and/or text can be conferenced using systems and methods in accordance with the present invention.

Accordingly, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A system for providing a shared voice communication link between three or more users, the system comprising:
   an application server communicably coupled to a packet based network, and accessible via a public switch telephone network; and
   a computer readable medium accessible to the application server, wherein the computer readable medium includes instructions executable by the application server to cause the application server to:
   receive an access request including a single access, reusable identification;
   identify a first connection associated with the single access, reusable identification;
   identify a second connection associated with the single access, reusable identification;
   initiate a ring indicator on a first telephone associated with the first connection;
   initiate a ring indicator on a second telephone associated with the second connection;
   receive a first audio signal via the first telephone;
   receive a second audio signal via the second telephone;
   receive a third audio signal via a telephone initiating the access reuest;
   mix the first, second, and third audio signals to create a mixed audio signal;
   provide the mixed audio signal to the first telephone;
   provide the mixed audio signal to the second telephone; and
   provide the mixed audio signal to the telephone initiating the access request.

2. The system of claim 1, wherein the single access identification is a conference telephone number.

3. The system of claim 1, wherein the single access identification is derived from a conference telephone number and an incoming identification.

4. The system of claim 3, wherein the incoming identification is a telephone number associated with a telephone initiating the access request.

5. The system of claim 3, wherein the incoming identification is a unique identification code associated with a telephone initiating the access request.

6. The system of claim 1, wherein the instructions further cause the application server to:
   receive an identification of the first connection associated with the first telephone;
   receive an identification of the second connection associated with the second telephone;
   group the first and second connections in a semi-static group; and
   associate the semi-static group with the telephone number.

7. The system of claim 6, wherein the instructions further cause the application server to:
   provide a graphical user interface for implementing the semi-static group.

8. The system of claim 7, wherein the graphical user interface is accessible via the first telephone.

9. The system of claim 7, wherein the graphical user interface is accessible to a computer communicably coupled to the Internet.

10. The system of claim 6, wherein the instructions further cause the application server to:
    receive an identification of a third connection associated with a third telephone; and
    group the third connection with the semi-static group.

11. The system of claim 6, wherein the semi-static group is selected from a group consisting of: family members, workgroup members, and friends.

12. The system of claim 1, wherein the first connection and the second connection are fixed fee connections.

13. The system of claim 12, wherein the fixed fee connections are selected from a group consisting of: a voice over IP connection, and a local telephone service connection.

14. The system of claim 1, wherein the first connection is selected from a group consisting of a per time connection, and a per access connection.

* * * * *